US010284290B2

(12) United States Patent
Grammel et al.

(10) Patent No.: US 10,284,290 B2
(45) Date of Patent: May 7, 2019

(54) PACKET ROUTING USING OPTICAL SUPERVISORY CHANNEL DATA FOR AN OPTICAL TRANSPORT SYSTEM

(71) Applicant: Juniper Networks, Inc., Sunnyvale, CA (US)

(72) Inventors: Gert Grammel, Ditzingen (DE); Domenico Di Mola, Fremont, CA (US); Steven B. Alleston, Saratoga, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 14/871,586

(22) Filed: Sep. 30, 2015

(65) Prior Publication Data

US 2017/0093487 A1    Mar. 30, 2017

(51) Int. Cl.
*H04B 10/038* (2013.01)
*H04B 10/077* (2013.01)
(Continued)

(52) U.S. Cl.
CPC ....... *H04B 10/0777* (2013.01); *H04B 10/038* (2013.01); *H04B 10/0773* (2013.01);
(Continued)

(58) Field of Classification Search
CPC .............. H04B 10/0777; H04B 10/038; H04Q 11/0066; H04L 45/22
See application file for complete search history.

(56) References Cited

U.S. PATENT DOCUMENTS 5,867,289 A   2/1999 Gerstel et al.
6,433,903 B1 * 8/2002 Barry ................ H04B 10/0731
398/79
(Continued)

FOREIGN PATENT DOCUMENTS

CN        1578223 A      2/2005
CN      101682459 A      3/2010
(Continued)

OTHER PUBLICATIONS

U.S. Appl. No. 14/042,614, by Nitin Bahadur, filed Sep. 30, 2013.
(Continued)

*Primary Examiner* — David C Payne
*Assistant Examiner* — Omar S Ismail
(74) *Attorney, Agent, or Firm* — Shumaker & Sieffert, P.A.

(57) ABSTRACT

In some examples, a network device comprises one or more processors operably coupled to a memory, and a routing unit configured for execution by the one or more processors to route data traffic on a layer 3 network overlaying an optical transport system; receive optical supervisory channel data for an optical supervisory channel of the optical transport system; determine the optical supervisory channel data indicates an event affecting transmission or detection of a signal transported by a wavelength, the wavelength traversing an optical fiber of the optical transport system and underlying a link of the layer 3 network; and reconfigure, in response to determining the optical supervisory channel data indicates the event, a configuration of the network device to modify routing operations of the network device with respect to the data traffic on the layer 3 network.

33 Claims, 4 Drawing Sheets

(51) Int. Cl.
  *H04L 12/24* (2006.01)
  *H04L 12/707* (2013.01)
  *H04Q 11/00* (2006.01)
  *H04J 14/02* (2006.01)
(52) U.S. Cl.
  CPC ........ *H04J 14/021* (2013.01); *H04J 14/0267* (2013.01); *H04L 41/06* (2013.01); *H04L 41/0672* (2013.01); *H04L 45/22* (2013.01); *H04Q 11/0066* (2013.01); *H04Q 2011/0073* (2013.01); *H04Q 2011/0077* (2013.01); *H04Q 2011/0081* (2013.01)

(56) References Cited

U.S. PATENT DOCUMENTS

| | | | |
|---|---|---|---|
| 7,190,896 B1* | 3/2007 | Wang | H04Q 11/0066 398/30 |
| 8,089,864 B2 | 1/2012 | Beller et al. | |
| 8,666,242 B2 | 3/2014 | Bianchi et al. | |
| 9,599,770 B2 | 1/2017 | Bottari | |
| 2002/0051284 A1* | 5/2002 | Takatsu | G06F 12/0866 359/341.1 |
| 2002/0071389 A1* | 6/2002 | Seo | H04L 45/00 370/232 |
| 2002/0181037 A1* | 12/2002 | Lauder | H04B 10/032 398/3 |
| 2005/0089027 A1* | 4/2005 | Colton | H04Q 11/0005 370/380 |
| 2007/0183317 A1* | 8/2007 | Vasseur | H04J 3/14 370/225 |
| 2007/0189265 A1* | 8/2007 | Li | H04L 41/0668 370/351 |
| 2008/0232244 A1 | 9/2008 | Gerstel et al. | |
| 2009/0080892 A1* | 3/2009 | Chang | H04J 14/0227 398/79 |
| 2009/0219806 A1* | 9/2009 | Chen | H04L 45/00 370/219 |
| 2009/0269057 A1 | 10/2009 | Tanaka | |
| 2010/0118732 A1* | 5/2010 | Filsfils | H04L 45/04 370/252 |
| 2011/0013507 A1* | 1/2011 | Gazzola | H04J 14/0287 370/216 |
| 2011/0080836 A1* | 4/2011 | Bragg | H04L 12/413 370/241.1 |
| 2012/0106333 A1* | 5/2012 | Lee | H04L 47/125 370/230 |
| 2012/0183294 A1* | 7/2012 | Boertjes | H04J 14/0204 398/49 |
| 2013/0121685 A1* | 5/2013 | Rao | H04J 14/0212 398/17 |
| 2015/0334004 A1* | 11/2015 | Hussain | H04L 1/0042 398/5 |

FOREIGN PATENT DOCUMENTS

| | | |
|---|---|---|
| CN | 103931123 A | 7/2014 |
| CN | 104253752 A | 12/2014 |
| WO | 2013184846 A1 | 12/2013 |

OTHER PUBLICATIONS

U.S. Appl. No. 14/788,602, by David C. Wood, filed Jun. 30, 2015.
Office Action and Search Report, and translation thereof, from counterpart Chinese Application No. 201610862450.0, dated Apr. 28, 2018, 13 pp.
Extended Search Report from counterpart European Application No. EP 16190785.2, dated Mar. 27, 2017, 6 pp.
Response to Extended Search Report dated Mar. 27, 2017, from counterpart European Application No. 3151457, filed Oct. 26, 2017, 15 pp.

* cited by examiner

PACKET ROUTING USING OPTICAL SUPERVISORY CHANNEL DATA FOR AN OPTICAL TRANSPORT SYSTEM

TECHNICAL FIELD

The disclosure relates to computer networks and, more specifically, multilayer packet-optical networks.

BACKGROUND

Wavelength-division multiplexing (WDM) networks operate by multiplexing different wavelength optical carrier signals onto optical fibers using different wavelengths. A WDM network employs WDM equipment such as Optical Cross-Connects (OXCs), Optical Add/Drop Multiplexers (OADMs), Reconfigurable OADMs (ROADMs), optical amplifiers, in order to establish end-to-end lightpaths (or "lambdas") between optical terminal equipment to form a virtual topology over the physical fiber topology. The WDM network in this way operates as an optical transport layer and may be dynamically reconfigured to provide lightpaths (also known as "lambdas" or "wavelengths") responsive to the traffic needs of client layers. The three distinct network layers—packet, circuit switching, and optical transport—have evolved towards a model where only two layers remain in the majority of networks: IP packets (routers) being transported over WDM (optical transport). Circuit switching (e.g., SONET/SDH) has either been removed entirely as packet traffic has become the dominant traffic type, or its function has been subsumed into optical transport network (OTN) switching embedded into optical transport systems.

Some optical networks allocate a separate wavelength to carry management and control information. Per the International Telecommunication Union (ITU-T) G.692 Recommendation, this Optical Supervisory Channel (OSC) is defined as a channel that is accessed at each optical line amplifier site that is used for maintenance purposes including (but not limited to) remote site alarm reporting, communication necessary for fault location, and orderwire. The Optical Supervisory Channel is not used to carry payload traffic.

The OSC is typically implemented as an additional wavelength outside the optical amplifier band in order to separate network management and control information from user data. In other words, the OSC may be an in-fiber, out-of-band supervisory channel. Management messages for the photonic layers (e.g., Optical Multiplex Section, Optical Transmission Section, and Optical Channel, as defined by ITU-T G.709) may all be sent on a single, common OSC. The OSC carries information about the WDM optical signal as well as remote conditions at the optical terminal or amplifier site. The OSC is also often used for remote software upgrades and network management information. The OSC generally terminates at each optical network element, including intermediate amplifier sites, where the optical network element adds local information for the optical network element before retransmitting.

SUMMARY

In general, techniques are described for exposing dynamic optical network characteristics obtained from an Optical Supervisory Channel (OSC) to a layer 3 network client layer of the optical network, and utilizing the characteristics to affect routing decisions in the layer 3 network. In some examples, a routing element (e.g., a router or controller) for a layer 3 network that operates over an optical network receives data, obtained from an OSC for the optical network, that describes operating characteristics for an optical link monitored by the OSC. In some instances, the routing element is configured to apply policies to the OSC data to make changes to a configuration of the routing element to modify routing operations of the routing element with respect to data traffic on the layer 3 network. In some instances, the routing element may also or alternatively utilize the OSC as a control channel to exchange informational or control data with another routing element in the client layer. In some instances, the router element may also or alternatively correlate obtained OSC data with data describing a routing/payload interface of the routing element and, in response, change a configuration of the routing element to modify routing operations.

For example, the routing element may apply policies that trigger (or inhibit) re-routing of IP traffic along IP links that represent, at least in part, optical paths that traverse the optical network. As another example, the routing element may use the OSC data to modify routing metrics for the IP links according to, for instance, operating characteristics of the underlying optical links that correlate to and affect service levels for the IP links. By incorporating additional optical layer operating characteristics into IP network routing decisions, the techniques may facilitate efficient service delivery by enabling the routing element to avoid unnecessary rerouting of IP traffic due to transient optical network conditions and to identify and account for IP links having impaired or otherwise deficient underlying optical links.

In one example, a method comprises receiving, by a network device that routes data traffic on a layer 3 network overlaying an optical transport system, optical supervisory channel data for an optical supervisory channel of the optical transport system; determining, by the network device, the optical supervisory channel data indicates an event affecting transmission or detection of a signal transported by a wavelength, the wavelength traversing an optical fiber of the optical transport system and underlying a link of the layer 3 network; and reconfiguring, by the network device in response to determining the optical supervisory channel data indicates the event, a configuration of the network device to modify routing operations of the network device with respect to the data traffic on the layer 3 network.

In another example, a network device comprises one or more processors operably coupled to a memory, and a routing unit configured for execution by the one or more processors to route data traffic on a layer 3 network overlaying an optical transport system; receive optical supervisory channel data for an optical supervisory channel of the optical transport system; determine the optical supervisory channel data indicates an event affecting transmission or detection of a signal transported by a wavelength, the wavelength traversing an optical fiber of the optical transport system and underlying a link of the layer 3 network; and reconfigure, in response to determining the optical supervisory channel data indicates the event, a configuration of the network device to modify routing operations of the network device with respect to the data traffic on the layer 3 network.

In another example, non-transitory computer-readable medium comprising instructions for causing one or more programmable processors to receive, by a network device that routes data traffic on a layer 3 network overlaying an optical transport system, optical supervisory channel data for an optical supervisory channel of the optical transport system; determine, by the network device, the optical supervisory channel data indicates an event affecting transmission or detection of a signal transported by a wavelength, the wavelength traversing an optical fiber of the optical transport system and underlying a link of the layer 3 network; and reconfigure, by the network device in response to determining the optical supervisory channel data indicates the event, a configuration of the network device to modify routing operations of the network device with respect to the data traffic on the layer 3 network.

The details of one or more examples are set forth in the accompanying drawings and the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

Figure 1:
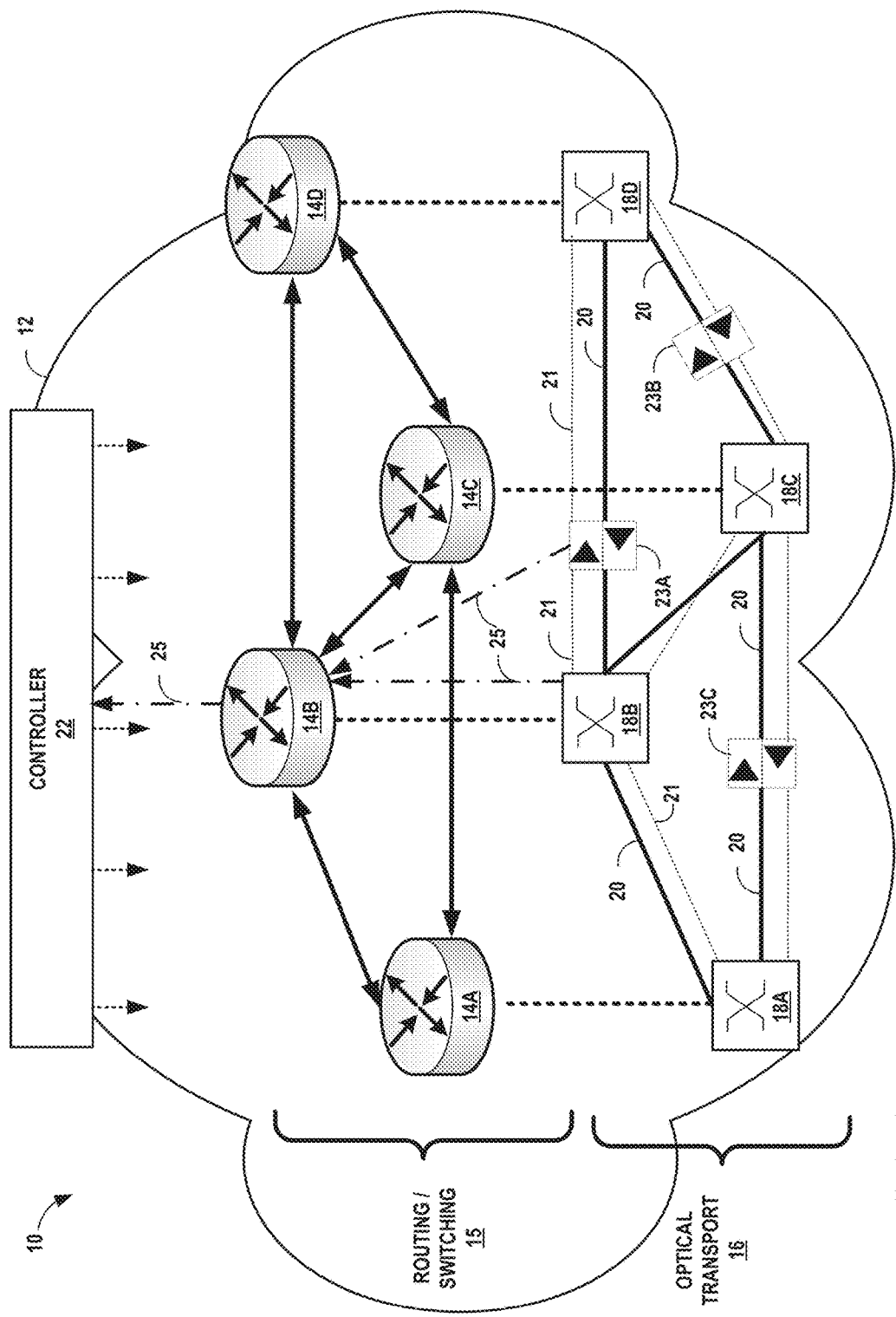
FIG. 1 is a block diagram illustrating an example system in which a multilayer network includes an optical transport layer that exposes optical supervisory channel data to a client routing layer for utilization in routing decisions, according to techniques described herein.

FIG. 1 is a block diagram illustrating an example system 10 in which a multilayer network includes an optical transport layer that exposes optical supervisory channel data to a client routing layer for utilization in routing decisions, according to techniques described herein. In this example, multi-layer network 12 includes a client routing layer in the form of routing/switching system 15 in which network elements 14A-14D ("network elements 14") control routing and switching of packet flows. Examples of network elements 14 include layer three (L3) routers and layer two (L2) switches that collectively provide routing/switching system 14.

Network elements 14 of routing/switching system 15 typically provide L2/L3 traffic forwarding services, such as IP forwarding, traffic engineering via Multi-Protocol Label Switching traffic-engineered (MPLS-TE) label switched paths (LSP), Virtual Local Area Network (VLANs), and so forth. Network/switching system 15 may represent a layer 3 network, such as an IP or IP/MPLS network, for example. Network elements 14 communicate and control traffic flows using a variety of traffic engineering protocols, such as the Label Distribution Protocol (LDP) and the Resource Reservation Protocol with Traffic Engineering extensions (RSVP-TE). In some aspects, network elements 14 may be IP routers that implement MPLS techniques and operate as label switching routers (LSRs) or label edge routers (LERs).

As further shown in FIG. 1, multi-layer network 12 further includes an optical transport layer in the form of an underlying optical transport system 16 for transporting, multiplexing and switching packet-based communications through high-speed optical fiber links. In this way, optical transport system 16 offers optical transport services to the client routing layer in the form of routing/switching system 15. In the example of FIG. 1, optical nodes 18A-18D (collectively, "optical nodes 18") are interconnected via optical links 20 and control transmission of optical signals carrying packet data along the links. In this way, optical transport system provides a physical layer that physically interconnects network elements 14 of routing/switching layer 15 to transport packetized data using optical signals. Optical transport system 16 may represent an Optical Transport Network (OTN) over WDM network system, SONET/SDH network over WDM network system, MPLS network over WDM network system, or other switching system that uses optical fiber as a transmission medium.

Optical nodes 18 may represent, for example, photonic cross-connects (PCXs), wavelength-division multiplexing (WDM)/dense WDM (DWDM), and time-division multiplexing (TDM)-based devices, optical cross-connects (OXCs), optical add-drop multiplexers (OADMs), reconfigurable OADMs (ROADMs), multiplexing devices, or other types of devices or other devices that transmit, switch and/or multiplex optical signals. Moreover, as shown in FIG. 1, optical transport system 16 typically includes a number of other components 23, such as amplifiers, transponders, Optical Transport Terminals (OTTs), repeaters, regenerators, and other equipment for controlling transmission of optical packet data along optical links 20. Each optical link 20 may include multiple different fiber sections. In instances in which optical transport system 16 includes an Optical Transport Network (OTN), e.g., as defined in part by ITU-T G.709, each optical link may include multiple Optical Multiplex Sections (OMS), Optical Transmission Sections (OTS) (or "Optical Transport Sections"), and transport multiple Optical Channels (OCh), each of which represents a transparent wavelength that provides optical transport through the optical transport system 16. For simplicity, FIG. 1 illustrates only a few optical components 23, although large optical transport systems may have significant numbers of such devices that influence optical transmissions.

In some example, network 12 may be a service provider network or metro carrier network that provides packet-based network services for subscriber devices (not shown). Example subscriber devices may be, for example, any of personal computers, laptop computers or other types of computing device associated with subscribers. Subscriber devices may comprise, for example, mobile telephones, laptop or desktop computers having, e.g., a 3G, 4G or 5G wireless card, wireless-capable netbooks, video game devices, pagers, smart phones, personal data assistants (PDAs) or the like. Subscriber devices may run a variety of software applications, such as word processing and other office support software, web browsing software, software to support voice calls, video games, videoconferencing, and email, among others.

In some example implementations, and as illustrated in FIG. 1, controller 22 provides control over both network elements 14 with respect to transport of packet data routing/switching system 15. For example, controller 22 may control path selection and traffic engineering operations of routing/switching system 15.

Network elements 14 are members of a path computation domain, which is in some examples served by controller 22. The path computation domain may include, for example, an Interior Gateway Protocol (IGP) (e.g., Open Shortest Path First (OSPF) or Intermediate System-to-Intermediate System (IS-IS)) area, an Autonomous System (AS), multiple ASes within a service provider network, multiple ASes that span multiple service provider networks or constrained shortest-path computations for Label-Switched-Paths (LSPs) based on the available RSVP bandwidth on the network links and the IP-traffic routed via these LSPs. In various examples, different combinations of network elements 14 may include member routers of multiple ASes. Network links connecting network elements 14 may thus be interior links, inter-AS transport links, another type of network link, or some combination thereof.

Network elements 14 by themselves, or in conjunction with controller 22, represent a client system that generates an overlay network "built on top of" underlying optical transport system 16. Network elements 14 are connected by virtual or logical links, each of which corresponds to a path in the underlying optical transport system 16. Each path may be traversed by a lightpath from a transmitting optical node 18 to a receiving optical node 18 and thus include one or more optical links 20 of the optical transport system 16.

Controller 22 may represent a high-level controller for configuring and managing multilayer network 12. Controller 22 may represent one or more general-purpose servers; an appliance, controller, or other special-purpose device for computing paths; an application executed by a computing device; a distributed control plane of routers 4 that computes paths for LSPs managed by the routers; and so forth. In some cases, aspects of controller 22 may be distributed among one or more real or virtual computing devices. Any such devices listed above may be in-network or out-of-network with regard to multilayer network 12. Example details of a software-defined networking (SDN) controller for a software-defined network, which may perform operations described herein to compute paths and route LSPs, are described in PCT International Patent Application PCT/US2013/044378, filed Jun. 5, 2013, and entitled, "PHYSICAL PATH DETERMINATION FOR VIRTUAL NETWORK PACKET FLOWS," which is incorporated by reference herein in its entirety. Additional examples details of an SDN controller for a software-defined network to obtain topology information for and to provision a network are described in U.S. patent application Ser. No. 14/042,614, filed Sep. 30, 2013, and entitled "SOFTWARE DEFINED NETWORK CONTROLLER," and U.S. patent application Ser. No. 14/788,602, filed Jun. 30, 2015, and entitled "Network Topology Optimization with Feasible Optical Paths," which are both incorporated by reference herein in their entireties.

Optical network elements of optical transport system 16, including optical nodes 18 and components 23, implement an optical supervisory channel (OSC) 21 on a separate wavelength that is out-of-band with the data transport wavelengths. Optical transport system 16 may use OSC 21 as a dedicated channel for carrying management and control information within the optical transport network 16. For example, a network management system for optical transport system 16 may use OSC 21 to perform remote software upgrades or otherwise configure components 23 or optical nodes 18, or to obtain information regarding the operation of components 23 or optical nodes 18, for instance. Optical network elements of optical transport system 16 may communicate via OSC 21 using Ethernet, OC-3, or another signal structure.

As noted above, OSC 21 may be an additional wavelength outside the optical amplifier band in order to separate network management and control information from user data. In other words, the OSC may be an in-fiber, out-of-band supervisory channel. Management messages for the photonic layers (e.g., Optical Multiplex Section, Optical Transmission Section, and Optical Channel, as defined by ITU-T G.709) may share an OSC. The OSC carries information about the WDM optical signal as well as remote conditions at the optical terminal or amplifier site. The OSC generally terminates at each optical network element, including intermediate components 23 (e.g., optical amplifiers), where it receives local information from components 23 before retransmission.

In accordance with techniques described in this disclosure, optical transport system 16 exposes optical supervisory channel information propagated on the OSC 21 to network elements 14 of the routing/switching system 15, which use the OSC data to inhibit or promote modifications to the topology of routing/switching system 15 or to inhibit or promote rerouting of IP traffic in the routing/switching system 15. In the illustrated example, optical node 18B and component 23A each sends OSC 25 to network element 14B. In some examples, network elements 14 may send the OSC data 25 to controller 22.

Lightpaths propagate optical signals through the optical transmission medium for a WDM network. Signal attenuation of lightpaths propagating through the optical fibers is proportional to distance and may also be result of optical loss for optical channels being switched through nodes. Because optical receivers have a minimum receiver sensitivity that defines the minimum power level of a lightpath required for the optical receiver to detect the signal, WDM networks include optical amplifiers to boost the signal power. Optical amplifiers for a WDM network enable simultaneous amplification of multiple wavelengths without optical-electrical-optical (O-E-O) conversion. Optical amplifiers may be located in-line with optical links to boost the signal power during transmission; optical amplifiers may also be located down-fiber from the WDM multiplexer (post-amplification) or up-fiber from the WDM demultiplexer (pre-amplification).

The erbium-doped fiber amplifier (EDFA) is a key enabling technology that extends the range of WDM networks, in particular Dense WDM (DWDM) networks. When excited by a pump laser, erbium emits light around 1.54 micrometers, which is the low-loss wavelength for optical fibers used in DWDM. The pump laser injects light at 980 nm or 1480 nm into the fiber that transmits the signals being amplified, which stimulates the erbium atoms to release their stored energy as additional 1550-nm light. This process amplifies the wavelengths along erbium-doped fiber for the EDFA. However, the EDFA also emits spontaneous emissions (also known as amplified spontaneous emissions (ASE)) that add noise to the signal, are propagated with signal on the optical link, and will be detected by the optical receiver. Spontaneous emissions thus interfere with the detection process at the optical receiver and may result in bit errors in the signal received by client devices of the IP layer operating over the WDM network.

In accordance with techniques described in this disclosure, an optical amplifier that amplifies optical signals for an optical link in a WDM network includes an associated transient detector that detects signal transients caused by ASE and sends an indication of the signal transient on the OSC 21. In some examples, the optical receiver for an optical link in WDM network includes an associated transient detector that detects signal transients caused by ASE and sends an indication of the signal transient on the OSC 21. A transient detector in this way provides indications of the spontaneous emissions generated by the optical amplifier to other devices on the OSC 21.

In some examples, OSC data 25 may include an indication of transient amplified spontaneous emissions (ASEs) from an optical amplifier that affects the optical signals being carried by wavelengths within the amplification band and may cause errors in signal detection at the optical receiver. In the absence of the techniques of this disclosure, such errors in the electrical signal may be interpreted at the routing/switching system 15 as an unreliable IP link and lead to rerouting of traffic on a path that does not include the IP link. For example, the errors may trigger an IP fast re-route (FRR) or MPLS FRR. Optical amplifiers of components 23 may identify transient ASEs and send indications of the transient ASEs on OSC 21. OSC data 25 exposed to the routing/switching system may include indications of the transient ASEs. An indication of a transient ASE may specify an optical link 20, a Shared-Risk Link Group (SRLG), or otherwise be associated with an IP link in the routing/switching system 15 that traverses the optical amplifier. In accordance with the techniques of this disclosure, network elements 14 may be configured to, in response to an indication in OSC data 25 of a transient ASE for an IP link, modify a reroute trigger threshold to increase an amount of signal degradation (as measured by bit error rate, e.g.) or an elapsed time for receiving a degraded signal on an IP link before rerouting at least some of the traffic transported by the IP link on another path that does not include the IP link, for example. As a result, rather than rerouting traffic from an IP link upon receiving a garbled signal on the IP link according to the unmodified reroute trigger threshold, network elements 14 may inhibit reroute (e.g., FRR) by temporarily applying the modified reroute trigger threshold in response to the indication of a transient ASE in OSC data 25. Routing/switching system 15 may in this way avoid routing instabilities and/or lost traffic caused by rerouting. The term "IP link" in this disclosure may refer to IGP link, Traffic Engineering (TE) link (e.g., an LSP or other tunnel having a representation included in a TE database of a routing element), or a combination thereof.

In some examples, OSC data 25 may include an indication of transient increases or decreases in signal power for a wavelength that may cause errors in signal detection at the optical receiver for the wavelength. The optical transport system 16 may in some deployments be modified by a network management system (not shown in FIG. 1) of the optical transport system 16 to add or remove wavelengths from fiber sections of optical links 20. The sudden addition or removal of a wavelength to/from an optical link 20 may cause transient decreases or increases, respectively, in the optical signal power of the other wavelengths on the due to effects at the optical transmitter. For example, a fiber may transport two wavelengths, which are amplified by an optical amplifier on the fiber according to a gain. If one of the two wavelength is removed, the prior gain remains applied to the overall optical signal at least temporarily until it is adjusted by the optical fiber. However, during the transition between the prior gain and the adjusted gain, the prior gain is no longer shared among multiple wavelengths but is instead applied in full to a single wavelength. This event caused by a transient and obsolete gain may occur as a result of any wavelength addition to or removal from a fiber. Automation effects on the WDM network or other optical transport system may thus briefly impact the quality of wavelength on a fiber.

Such transients may cause errors in signal detection at the optical receiver for the other wavelengths. In the absence of the techniques of this disclosure, resulting errors in the electrical signal may be interpreted at the routing/switching system 15 as unreliable IP links that overlay the additional wavelengths and lead to rerouting of traffic on paths that do not include the IP link. For example, the errors may trigger an IP fast re-route (FRR) or MPLS FRR. This may involuntarily trigger a network element 14 of routing/switching system 15 to reroute all traffic, such as by performing pre-forward error correction (pre-FEC) FRR, despite the signal quality impact being brief and deterministic.

Optical nodes 18 and/or components 23 may identify these transients caused by such automation effects and send indications of the transients on OSC 21. OSC data 25 exposed to the routing/switching system in accordance with the techniques described herein may include indications of the transients. An indication of a transient may specify an optical link 20, a Shared-Risk Link Group (SRLG), or otherwise be associated with an IP link in the routing/switching system 15 affected by the transient. In accordance with the techniques of this disclosure, network elements 14 may be configured to, in response to an indication in OSC data 25 of a transient for an IP link, modify a reroute trigger threshold to increase an amount of signal degradation (as measured by bit error rate, e.g.) or an elapsed time for receiving a degraded signal on an IP link before rerouting at least some of the traffic transported by the IP link on another path that does not include the IP link. As a result, rather than rerouting traffic from an IP link upon receiving a garbled signal on the IP link according to the unmodified reroute trigger threshold, network elements 14 may inhibit reroute (e.g., FRR) by temporarily applying the modified reroute trigger threshold in response to the indication of a transient in OSC data 25. Routing/switching system 15 may in this way avoid routing instabilities and/or lost traffic caused by rerouting. In some cases, the network management system may directly advertise an impending change to the wavelength composition of a fiber segment to the routing/switching system 15. In some cases, the routing/switching system 15 may request a new optical path (or "lightpath") for an IP link, which will result in a change to the wavelength composition of a fiber segment to the routing/switching system 15. Based on the impending changes known to the routing/switching system 15 described above, network elements 14 may modify the reroute trigger threshold.

In some examples, OSC data 25 may include attenuation data for sections of optical links 20. Optical nodes 14 and components 23 may measure input power of the incoming wavelengths on an optical link 20 and determine an attenuation of the optical link 20. Optical nodes 14 and components 23 may exchange this information via the OSC 21 and expose OSC data 25 including attenuation data indicating attenuations for various optical links 20. In addition, optical nodes 14 and components 23 may send indications of their respective existences in OSC data 25 to the routing/switching system 15. The OSC 21 is aware of the number of amplifiers in the network, for example. In accordance with the techniques of this disclosure, network elements 14 may be configured to, based on attenuation data for sections of optical links 20 and on the components 23 that operate on a given wavelength, as provided in OSC data 25, the routing/switching system 15 may determine underlying physical lengths of wavelengths underlying IP links, the underlying physical lengths correlative to the fiber length and/or the number of components traversed by the wavelengths.

For instance, optical links 20 carry both the payload wavelengths and OSC 21. However, unlike the payload wavelengths that are terminated at transponders for the wavelengths and thus provide signal quality indications at the transponders alone, OSC 21 is terminated by intermediate optical components 23 (such as optical amplifiers) along a fiber. As such, the OSC 21 signal may be used by OSC 21 termination devices to determine signal quality on a per-fiber-segment (e.g., per-OTS as terminated by optical line amplifiers) basis. Optical transport system 16 may further utilize OSC 21 to exchange indications of fiber segment anomalies in OSC data 25.

Network elements 14 of routing/switching plane 15 may obtain OSC data 25 including indications of fiber segment anomalies, as well as optical receiver signal quality information from payload interfaces for wavelengths. OSC data 25 and optical receiver signal quality may individually or in combination indicate a need to perform fast reroute, change IP link metrics, and other actions described herein. The OSC data 25 from OSC 21 facilitates localization of disturbances and provides performance information that can be used as indicators for proactive reroute (for instance). Such performance information may include, e.g., operating temperature of an optical amplifier that can lead to a proactive reroute if the operating temperature exceeds a threshold. For instance, if a payload interface of a network element 14 receives optical receiver signal quality information indicating a sporadic Optical SNR degradation and the OSC data 25 indicates a spontaneous emission, the network element 14 may apply a policy to reconfigure the network element 14 to reroute or modify IP link metrics, send an indication of the signal degradation to a neighbor network element 14, and other actions described herein.

Because a "physically long" IP link (i.e., a relatively physically long optical path traversed by a wavelength underlying the IP link) will typically have fewer components 23 acting upon it and thus have a lower mean time between failure (MTBF) relative to a "physically short" IP link, the routing elements 14 may assign a relatively larger IP metric to the longer IP link. As a result, routing/switching plane 15 may subsequently favor physically shorter IP links for transporting IP packets, other variables being held equal. OSC data 25 exposed to routing/switching plane 15 may in this way provide visibility into the MTBF and its inverse: failure in time (FIT) rate, and may lead to routing decisions by routing elements 14 (or controller 22) that preferentially route traffic onto IP links having a lower FIT rate.

In some examples, OSC data 25 may include an indication of a fiber intrusion or fiber damage. Malicious operatives may monitor a wavelength by tapping a fiber for an optical link 20 that transports the wavelength. Such tapping may be detected at optical nodes 18 and/or components 23 by measuring the attenuation on sections of optical links 20. In some cases, optical nodes 18 and/or components 23 measure the attenuation on the wavelength for OSC 21, which is in-band and thus also affected by intrusion of or damage to the fiber. If the measured signal power on a fiber section drops unexpectedly and persistently but the wavelength is still present (in other words, the wavelength is "lit" but the signal power is persistently weak), such increased attenuation may be an indication that the fiber is being tapped or is otherwise damaged. Optical nodes 18 and/or components 23 may determine unexpected and persistent drop in signal power by computing a running average of measured signal power, using analog devices to threshold the drop, or other suitable techniques. Optical nodes 18 and/or components 23 may exchange an alarm or other indication of increased attenuation on OSC 21. In turn, and as described herein such indications may be exposed to routing/switching system 15 via OSC data 25. In response to receiving, in OSC data 25, an indication of increased attenuation (which may itself be an indication of a fiber intrusion), elements of routing/switching system 15 may identify affected IP links transported by the underlying affected fiber and proactively reroute traffic on one or more paths that do not include the affected IP links. In some cases, routing/switching system increases an IP metric for IP links to affect subsequent routing decisions. Routing/switching system 15 may in this way route traffic around fiber intrusions and/or fiber damage, which may improve the security of the traffic and/or reliability of the service.

In some examples, OSC data 25 may include indications of failure of optical amplifiers of components 23. Optical amplifiers of components 23 may self-diagnose failures that lead to errors in signal transmission and receipt and corresponding errors on overlay links. Such failures may result from, for instance, laser pump failure, temperature-induced performance effects, electrical power effects, or an open-door situation for the amplifier. Rather than transient effects, such failures may be relatively persistent. Components 23 may exchange, on OSC 21, indications of failure of optical amplifiers of components 23. In accordance with the techniques of this disclosure, such indications may be exposed to routing/switching system 15 via OSC data 25. In response to receiving, in OSC data 25, an indication of optical amplifier failure for an optical amplifier for a fiber section of one of optical links 20, elements of routing/switching system 15 may identify affected IP links transported by the underlying affected fiber and proactively reroute traffic on one or more paths that do not include the affected IP links. In some cases, routing/switching system increases an IP metric for IP links to affect subsequent routing decisions. Routing/switching system 15 may in this way route traffic around failed optical amplifiers, which may improve the security of the traffic and/or reliability of the service.

As described in this disclosure, by incorporating additional optical layer operating characteristics into routing and/or switching decisions for the routing/switching system 15, the techniques may facilitate efficient service delivery by enabling the routing/switching system 15 to avoid unnecessary rerouting of traffic due to transient optical network conditions and to identify and account for links having impaired or otherwise deficient underlying optical links, for instance.

Figure 2:
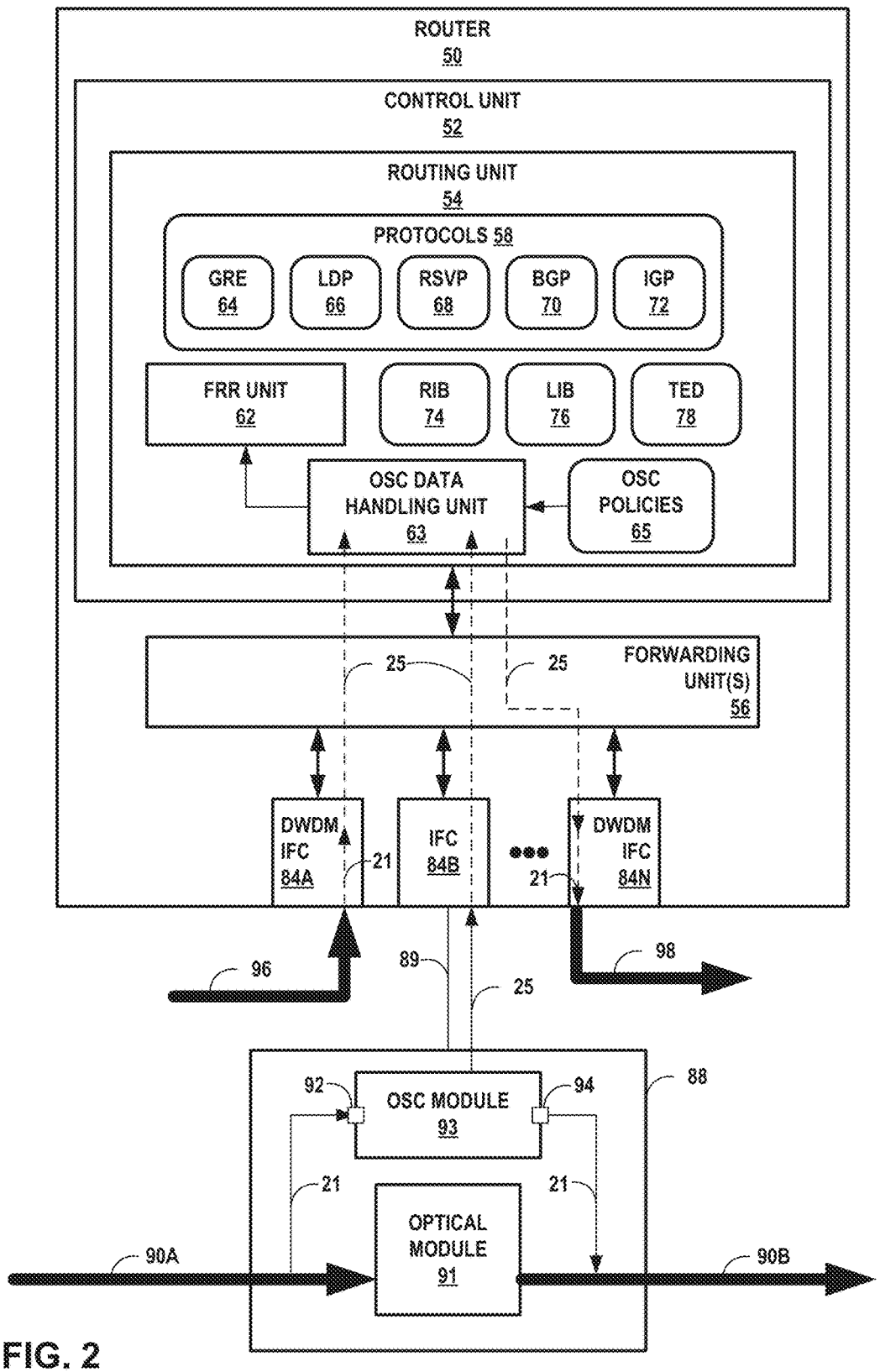
FIG. 2 is a block diagram illustrating an example router that receives optical supervisory channel data and responsively modifies routing of data traffic, in accordance with techniques described herein.

FIG. 2 is a block diagram illustrating an example router that receives optical supervisory channel data and responsively modifies routing of data traffic, in accordance with techniques described herein. Router 50 may represent any of network elements 14 from FIG. 1. For instance, router 50 may represent a layer 3 (L3) router, an L3 switch, a LSR/LER, or other switching device for an overlay network overlaying a WDM network. In the illustrated example of FIG. 2, router 50 includes a control unit 52 with a routing unit 54 that provides control plane functionality for the router and one or more forwarding unit(s) 56 (hereinafter, "forwarding unit 56") that provides forwarding or data plane functionality for the router to send and receive traffic by a set of packet interface cards 84A-84N ("IFCs 84") that typically have one or more physical network interface ports. DWDM IFCs 84A, 84N include integrated DWDM equipment configured to send and receive colored wavelengths (including OSC 21). While described primarily with respect to DWDM, the techniques are applicable to interface cards for interfacing with other types of WDM networks.

Control unit 52 may include one or more daemons (not shown) that comprise user-level processes that run network management software, execute routing protocols to communicate with peer routers or switches, maintain and update one or more routing tables in routing unit 54, and create one or more forwarding tables for installation in forwarding unit 56, among other functions. Although not shown in FIG. 2, control unit 52 may include one or more programmable processors operably coupled to memory.

Forwarding unit 56 performs packet switching and forwarding of incoming data packets for transmission over a network. As shown in FIG. 2, forwarding unit 56 includes a forwarding information base (FIB) 80 that stores forwarding data structures associating network destinations with nexthops and outgoing interfaces. Forwarding unit 56 may represent a line card having a one or more network processing units coupled to IFCs 84. Forwarding unit 56 also includes a label FIB (LFIB) 82 that stores label routes associating an incoming label for a given LSP with an outgoing label and a nexthop router. Although not shown in FIG. 2, forwarding unit 56 may comprise a forwarding unit processor, memory, and one or more programmable packet-forwarding application-specific integrated circuits (ASICs).

Routing unit 54 includes various protocols 58 that perform routing functions for router 50. In the illustrated example of FIG. 2, routing unit 54 includes BGP 70 and IGP 72 as routing protocols used to exchange routing information with other routing devices in a network in order to discover the network topology and update/advertise a routing information base (RIB) 74. In the examples described in this disclosure, IGP 72 may be a link-state routing protocol such as open shortest path first (OSPF) or intermediate system-intermediate system (IS-IS). In addition, routing unit 54 includes RSVP 68, and specifically RSVP-TE, as a path setup protocol used to establish traffic paths, i.e., LSPs, with the other network devices in the network using RIB 74. Routing unit 54 uses RSVP 68 to exchange label mapping messages with other routing devices along the LSPs and update a label information base (LIB) 76.

RIB 74 may describe the topology of the network in which router 50 resides, and may also describe various routes within the network and the appropriate nexthops for each route, i.e., the neighboring routing devices along each of the routes. Routing unit 54 analyzes the information stored in RIB 74 to generate forwarding information. Routing unit 54 then installs forwarding data structures into FIB 80 within forwarding unit 56. FIB 80 associates network destinations with specific nexthops and corresponding interface ports within the forwarding plane. LIB 76 maintains mappings of nexthop labels to the nexthops for each route within the network from RIB 74. Routing unit 54 selects specific paths through the network and installs the nexthop label mappings for the nexthops along those specific paths in LFIB 82 within forwarding unit 56.

In some examples, routing unit 54 uses RSVP 68 to generate and maintain a traffic engineering database (TED) 78 including a complete list of nodes and links in the network that are participating in traffic engineering and a set of attributes for each of the links. For example, TED 78 may include bandwidth reservations for links associated with LSPs through the network. Routing unit 54 may use IGP 72 to advertise the traffic engineering attributes stored in TED 78 to other routing devices in the network. Routing unit 54 may also receive IGP advertisements including traffic engineering attributes from the other routing devices in the network and update TED 78. RIB 74 and TED 78 are both example instances of "routing databases."

According to the techniques described in this disclosure, router 50 is configured to provide fast re-route node and/or link protection and to incorporate OSC data 25 from OSC channel 21 in the optical transport network for fast re-route decision-making Router 50 may operate as an ingress edge router of a primary LSP between the ingress edge router and an egress edge router and/or as a point of local repair (PLR) router configured to provide FRR node and/or link protection. Routing unit 54 uses FRR unit 62 to establish a bypass LSP with a merge point (MP) router along the primary LSP. More specifically, FRR unit 62 may establish the bypass LSP using either LDP 66 or RSVP 68. Routing unit 54 may then install a backup nexthop for the newly established bypass LSP in LFIB 82 within forwarding unit 56.

Optical network element 88 receives and transmits wavelengths 90A-90B ("wavelengths 90") via optical fibers coupled to the optical network element 88. Optical network element 88 may represent a WDM equipment such as an OXC, OADM, ROADM, optical amplifier such as erbium-doped fiber amplifier apparatus. Optical network element 88 includes an optical module 81 configured to perform the associated function for the optical network element. For example, for an optical amplifier instance of optical network element 88, optical module 91 amplifies wavelengths 90. As another example, for an OXC instance of optical network element 88, optical module 91 optically switches wavelengths from input ports to output ports according to a switching configuration.

OSC module 93 interfaces with an OSC 21 for an optical transport network that includes optical network element 88. OSC module 93 may execute one or more OSC protocols to exchange OSC data with other optical network elements to, e.g., perform remote software upgrades, receive configuration data for optical module 91, or to obtain information regarding the operation of other optical network elements, for instance. In some examples (e.g., OXCs), optical network element 88 may have fiber adjacencies with multiple optical network elements and thus support multiple OSCs 21. OSC 21 is carried on a dedicated wavelength received and terminated by optical network element 88 and directed by optical network element 88 to optical-to-electrical (O/E) converter 92 of OSC module 93 to produce electric signals representing OSC data cognizable to OSC module 93. OSC module 93 may process the OSC data. Likewise, OSC module 93 may generate OSC data including local information for optical network element 88 and direct electrical signals representing the OSC data to electric-to-optical (E/O) converter 94, which converts the electrical signal to the dedicated wavelength for OSC 21, which optical network element 80 then combines with the data wavelengths for output as wavelengths 90B. For example, OSC module 93 may identify transient ASEs, identify unexpected signal attenuation on the fiber indication intrusion or fiber damage, and identify a failure of the OSC module 93 or other failure of optical network element 88 to properly generate wavelengths 90B. OSC module 93 may generate OSC data 25 indicating any of these identified phenomena for propagation via OSC 21. Similarly, OSC module 93 may receive, via OSC 21, OSC data 25 from other optical network elements indicating any of these identified phenomena at another optical network element.

Communication link 89 couples optical network element 88 to IFC 84B of router 50. Communication link 89 may represent an Ethernet link, and OSC-3 link, or other suitable communication link. OSC module 93 sends, via communication link 89, OSC data 25 to router 50. In some examples, optical network element 88 may be an OADM/ROADM or other optical network element integrated within a router 50 chassis and directly coupled to the router backplane or midplane. Forwarding unit 56 internally forwards the OSC data 25 to routing unit 54.

Additionally or alternatively, DWDM IFCs 84A, 84N may terminate the OSC 21. Wavelengths 96 and 98 (e.g., DWDM wavelengths) may include multiple wavelengths for data transport, as well as the dedicated OSC 21 wavelength. In some examples, wavelengths 96, 98 may include only the dedicated OSC 21 wavelength. DWDM IFCs 84A, 84N may each include an optical receiver, transponder, and O/E converter to isolate OSC 21 and convert the optical OSC 21 signal to electrical signals. DWDM IFC 84A may further extract OSC data 25 from the OSC 21 transmission protocol, and forwarding unit 56 may internally forward OSC data 25 to routing unit 54. To send signals on OSC 21, DWDM IFCs 84A, 84N may each include an optical transmitter, transponder, and E/O converter to convert electrical signals to the optical OSC 21 signal. DWDM IFC 84A may further package OSC data 25 received from routing unit 54 according to the OSC 21 transmission protocol.

As described above, the OSC data 25 via communication link 89 may be obtained by OSC module 93 from an OSC 21 for the optical transport system or otherwise generated by OSC module 93. OSC data 25 received via DWDM IFC 84A may be directly obtained from an OSC 21 terminated by the router 50. Other techniques by which a router 50 or other routing/switching element may obtain the OSC data 25 from an optical supervisory channel are also contemplated. For instance, routing unit 54 may communicate with a network management system for the optical transport system to obtain OSC data 25. In other words, the router 50 may tap into the OSC 21 to obtain OSC data 25 by directly terminating an OSC 21 wavelength (e.g., at DWDM IFC 84A), by receiving OSC data 25 from an optical network element 88 that generates the OSC data 25 for OSC 21 or receives the OSC data 25 via OSC 21, or by receiving the OSC data 25 from an optical network management system, as examples.

Routing unit 54 includes an OSC data handling unit 63 configured to receive and process the OSC data 25, and to apply one or more OSC policies 65 with respect to the OSC data 25. OSC policies 65 may be user-configurable via an administrative interface to router 50 (not shown), such as a command-line interface, a graphical user interface, a network management system API for a layer 3 network management system, and the like. OSC policies 65 specify one or more actions that, upon occurrence of a condition indicated in OSC data 25, cause OSC data handling unit 63 to, e.g., modify an operation of FRR unit 62 or modify RIB 74/LIB 76/TED 78.

For instance and as described herein, responsive to OSC data 25, the OSC data handling unit 63 may apply policies that trigger (or inhibit) re-routing of IP traffic along IP links that represent, at least in part, optical paths that traverse the optical network. For instance, indications of optical component failures or intrusions in OSC data 25 may trigger FRR unit 62 to reroute traffic on a bypass LSP that bypasses the IP links overlaying affected optical links. Alternatively, indications of ASE transients, for instance, may inhibit FRR unit 62 from rerouting traffic on a bypass LSP by causing routing 54 to modify a value of a reroute trigger threshold for triggering the bypass LSP switchover. As another example, the routing element may use the OSC data 25 to modify IP metrics in RIB 74 and/or TED 78 for the IP links according to, for instance, operating characteristics of the underlying optical links that correlate to and affect service levels for the IP links.

In addition, router 50 may utilize OSC 21 to send information to remote routers of a network to notify the remote routers of status changes at router 50 and/or along optical links terminated by the router 50 or optical network element 88. For example, router 50 may receive OSC data 50 indicating, according to any of the techniques described in this disclosure, that an IP link metric for an IP link from a remote router to router 50 should be increased or that fast reroute should be performed by a remote router. Router 50 may send, via OSC 21, this indication to the remote router in OSC data 25, which receives the OSC data 25 and performs actions responsive to the indication. In this way, routers of a client layer may use OSC 21 to exchange performance information describing an optical transport system and take ameliorative actions.

Figure 3:
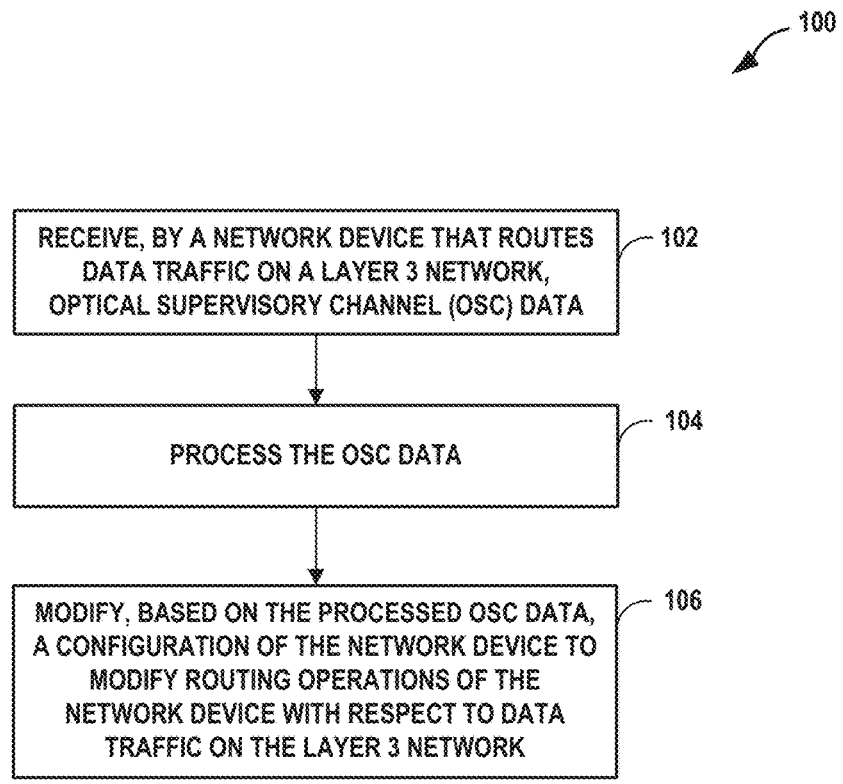
FIG. 3 is a flowchart illustrating an example mode of operation for a network device operating according to techniques described herein.

FIG. 3 is a flowchart illustrating an example mode of operation for a network device operating according to techniques described herein. Mode of operation 100 is described with respect to router 50 of FIG. 2 but may be applied by other network devices, such as a layer 3 switching element or a controller, such as controller 22 of FIG. 1. Router 50 routes IP data traffic, e.g., via a layer 3 network, and receives optical supervisory channel (OSC) data 25 for an optical supervisory channel 21 (102). Router 50 processes the OSC data 25 to determine OSC information indicating events or OSC information including optical topology data that may affect routing on the layer 3 network that includes router 50 (104). In response to identifying the OSC information, the router 50 modifies its configuration to modify routing its operations with respect to data traffic on the layer 3 network (106).

Figure 4:
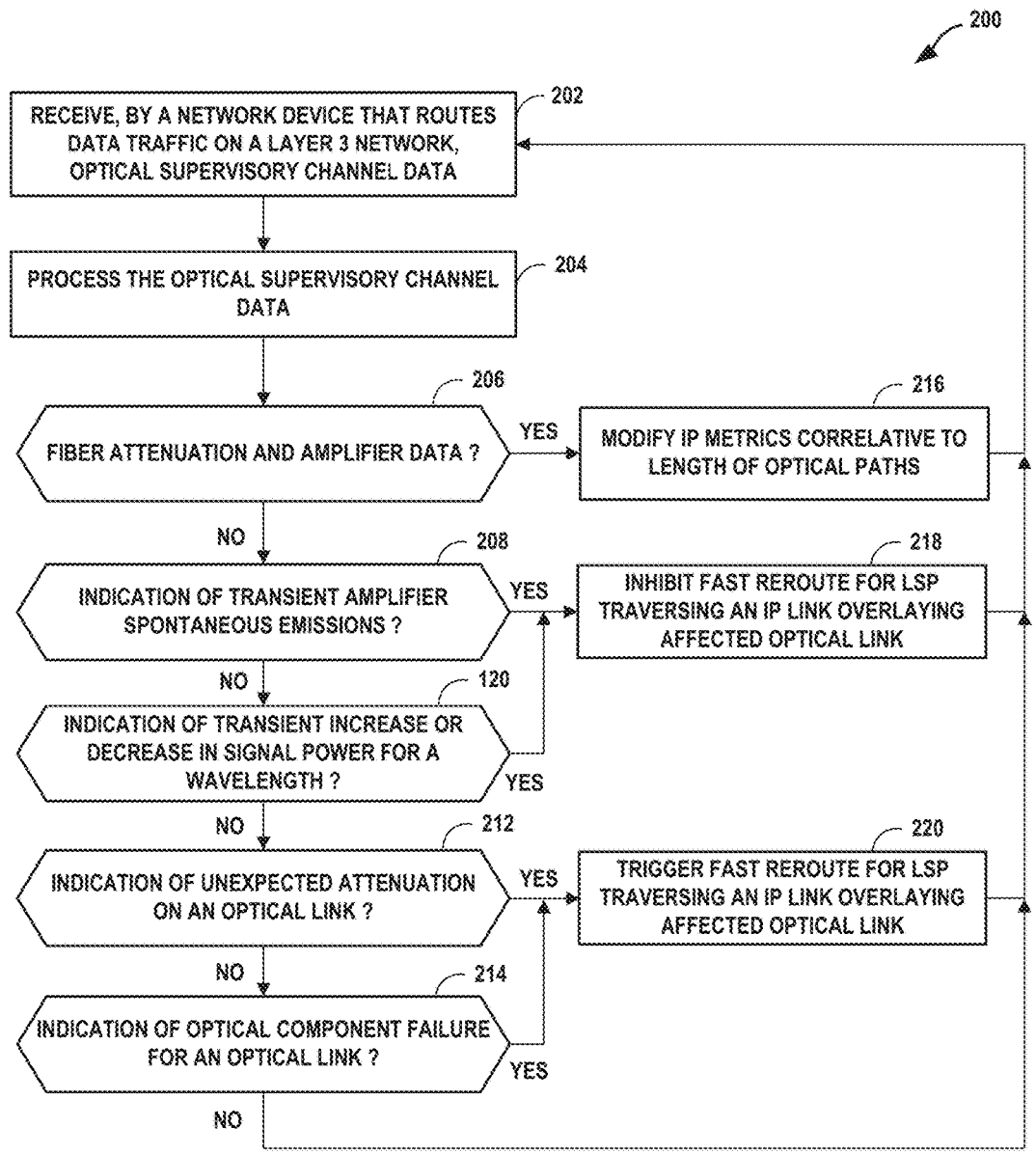
FIG. 4 is a flowchart illustrating an example mode of operation for a network device operating according to techniques described herein.

FIG. 4 is a flowchart illustrating an example mode of operation for a network device operating according to techniques described herein. Mode of operation 200 is described with respect to router 50 of FIG. 2 but may be applied by other network devices, such as a layer 3 switching element or a controller, such as controller 22 of FIG. 1.

Router 50 routes IP data traffic, e.g., via an IP or IP/MPLS network, and receives optical supervisory channel (OSC) data 25 for an optical supervisory channel 21 (202). OSC data handling unit 63 of router 50 processes the OSC data 25 to identify OSC information indicating events or OSC information including optical topology data that may affect routing on the IP network that includes router 50 (204). If the OSC data 25 includes fiber attenuation and amplifier data (YES branch of 206), OSC data handling unit 63 may determine underlying physical lengths of wavelengths underlying IGP/TE links for the IP network, where the underlying physical lengths are correlative to the fiber length and/or the number of components traversed by the wavelengths. In order to favor IGP/TE links overlaying "physically shorter" wavelengths in routing decisions due to correlation of shorter paths and lower FIT rates, OSC data handling unit 63 may modify RIB 74/TED 78 to associate relatively shorter metrics with such IGP/TE links (216). For example, if two links or otherwise similar but one link overlays a wavelength having a "longer" optical path in that the path has a relatively longer overall length of fiber and/or relatively more optical amplifiers than the optical path traverses by the wavelength underlying the other link, then OSC data handling unit 63 may modify the relative IP metrics for the two links in order to favor the "shorter" link for path computation.

The OSC data 25 may indicate an event affecting transmission or detection of a signal transported by a wavelength that traverses an optical link and underlies an IP link (NO branch of 206).

If the OSC data 25 indicates transient amplifier spontaneous emissions (ASEs) by an amplifier for an optical path traversed by a wavelength underlying an IP link (YES branch of 208), OSC data handling unit 63 may inhibit FRR unit 62 from performing a fast reroute to switch traffic from an LSP that traverses the IP link to a bypass LSP that bypasses the IP link (218). For example, OSC data handling unit 63 may temporarily modify, in FRR unit 62, a fast reroute trigger threshold for LSP until such time as the transient ASE event is completed (i.e., no longer affecting the optical signal at the optical receives in a manner that would otherwise trigger FRR).

If the OSC data 25 indicates a transient increase or decrease in signal power for an optical path traversed by a wavelength underlying an IP link (YES branch of 120), OSC data handling unit 63 may inhibit FRR unit 62 from performing a fast reroute to switch traffic from an LSP that traverses the IP link to a bypass LSP that bypasses the IP link (218). For example, OSC data handling unit 63 may temporarily modify, in FRR unit 62, a fast reroute trigger threshold for LSP until such time as the transient ASE event is completed (i.e., no longer affecting the optical signal at the optical receives in a manner that would otherwise trigger FRR).

If the OSC data 25 indicates unexpected attenuation of the signal power for an optical path traversed by a wavelength underlying an IP link (YES branch of 222), OSC data handling unit 63 may trigger FRR unit 62 to perform a fast reroute to switch traffic from an LSP that traverses the IP link to a bypass LSP that bypasses the IP link (220). In some examples, however, OSC data handling unit 63 may modify metrics for the IP link in RIB 74/TED 78 to increase the metric for the IP link to disfavor the link during routing decisions.

If the OSC data 25 indicates optical component failure for an optical path traversed by a wavelength underlying an IP link (YES branch of 214), OSC data handling unit 63 may trigger FRR unit 62 to perform a fast reroute to switch traffic from an LSP that traverses the IP link to a bypass LSP that bypasses the IP link (220). In some examples, however, OSC data handling unit 63 may modify metrics for the IP link in RIB 74/TED 78 to increase the metric for the IP link to disfavor the link during routing decisions.

In some cases, OSC data handling unit 63 may perform other operations to modify a configuration of router 50 in response to the above indications, or to other indications of events in the optical transport system that are propagated on OSC 21 and may affect the services applied to IP traffic routed over the IP network underlain by the optical transport system (e.g., a WDM network).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
   receiving, by a network device that routes data traffic on a layer 3 network overlaying an optical transport system, optical supervisory channel data for an optical supervisory channel of the optical transport system, wherein the optical supervisory channel is transported by a first wavelength;
   determining, by the network device, the optical supervisory channel data indicates an event affecting transmission or detection of a signal transported by a second wavelength, the second wavelength traversing an optical fiber of the optical transport system and underlying a link of the layer 3 network; and
   reconfiguring, by the network device in response to determining the optical supervisory channel data indicates the event, a configuration of the network device to modify routing operations of the network device with respect to the data traffic on the link of the layer 3 network, wherein the reconfiguring comprises triggering a Multiprotocol Label Switching (MPLS) fast reroute operation within the layer 3 network to bypass the link of the layer 3 network.

2. The method of claim 1, wherein the optical supervisory channel comprises an in-fiber supervisory channel that is terminated by optical amplifiers of the optical transport system, and wherein the first wavelength is outside of the amplification band of the optical amplifiers.

3. The method of claim 1, wherein the triggering comprises triggering the fast reroute operation to cause the network device to subsequently forward traffic on a bypass label switched path for a label switched path that traverses the link, wherein the bypass label switched path bypasses the link.

4. A method comprising:
   receiving, by a network device that routes data traffic on a layer 3 network overlaying an optical transport system, optical supervisory channel data for an optical supervisory channel of the optical transport system, wherein the optical supervisory channel is transported by a first wavelength;

determining, by the network device, the optical supervisory channel data indicates an event affecting transmission or detection of a signal transported by a second wavelength, the second wavelength traversing an optical fiber of the optical transport system and underlying a link of the layer 3 network; and reconfiguring, by the network device in response to determining the optical supervisory channel data indicates the event, a configuration of the network device to modify routing operations of the network device with respect to the data traffic on the link of the layer 3 network, wherein the reconfiguring comprises inhibiting a Multiprotocol Label Switching (MPLS) fast reroute operation within the layer 3 network from bypassing the link of the layer 3 network.

5. A method comprising:

receiving, by a network device that routes data traffic on a layer 3 network overlaying an optical transport system, optical supervisory channel data for an optical supervisory channel of the optical transport system, wherein the optical supervisory channel is transported by a first wavelength;

determining, by the network device, the optical supervisory channel data indicates an event affecting transmission or detection of a signal transported by a second wavelength, the second wavelength traversing an optical fiber of the optical transport system and underlying a link of the layer 3 network; and reconfiguring, by the network device in response to determining the optical supervisory channel data indicates the event, a configuration of the network device to modify routing operations of the network device with respect to the data traffic on the link of the layer 3 network, wherein the reconfiguring comprises modifying any one or more of a traffic engineering database, a routing information base, and a label information base stored by the network device.

6. A network device comprising:

one or more processors operably coupled to a memory;
a routing unit configured for execution by the one or more processors to:
  route data traffic on a layer 3 network overlaying an optical transport system;
  receive optical supervisory channel data for an optical supervisory channel of the optical transport system, wherein the optical supervisory channel is transported by a first wavelength;
  determine the optical supervisory channel data indicates an event affecting transmission or detection of a signal transported by a second wavelength, the second wavelength traversing an optical fiber of the optical transport system and underlying a link of the layer 3 network; and
  reconfigure, in response to determining the optical supervisory channel data indicates the event, a configuration of the network device to modify routing operations of the network device with respect to the data traffic on the link of the layer 3 network, wherein to reconfigure the configuration the routing unit is configured to inhibit an MPLS fast reroute operation within the layer 3 network from bypassing the link of the layer 3 network.

7. A network device comprising:

one or more processors operably coupled to a memory;
a routing unit configured for execution by the one or more processors to:
  route data traffic on a layer 3 network overlaying an optical transport system;
  receive optical supervisory channel data for an optical supervisory channel of the optical transport system, wherein the optical supervisory channel is transported by a first wavelength;
  determine the optical supervisory channel data indicates an event affecting transmission or detection of a signal transported by a second wavelength, the second wavelength traversing an optical fiber of the optical transport system and underlying a link of the layer 3 network; and
  reconfigure, in response to determining the optical supervisory channel data indicates the event, a configuration of the network device to modify routing operations of the network device with respect to the data traffic on the link of the layer 3 network, wherein to reconfigure the configuration the routing unit is configured to modify any one or more of a traffic engineering database, a routing information base, and a label information base stored by the network device.

8. The method of claim 1,
wherein the first wavelength is outside of an amplification band of optical amplifiers of the optical transport system; and
wherein the second wavelength is within the amplification band of optical amplifiers of the optical transport system.

9. The method of claim 4, wherein the inhibiting comprises inhibiting, by the network device, the fast reroute operation for a label switched path that traverses the link to inhibit the network device from subsequently forwarding traffic on a bypass label switched path for the label switched path, wherein the bypass label switched path bypasses the link.

10. The method of claim 5, wherein reconfiguring the configuration of the network device comprises modifying, in the any one or more of the traffic engineering database, the routing information base, and the label information base, a routing metric associated with the link.

11. The method of claim 4,
wherein determining the optical supervisory channel data indicates the event comprises determining, by the network device, the optical supervisory channel data indicates transient amplifier spontaneous emissions by an optical amplifier for the optical fiber that amplifies optical signals transported by the second wavelength traversing the optical fiber, and
wherein the inhibiting comprises inhibiting, by the network device in response to determining the optical supervisory channel data indicates the transient amplifier spontaneous emissions, the fast reroute operation for a label switched path that traverses the link to inhibit the network device from subsequently forwarding traffic on a bypass label switched path for the label switched path, wherein the bypass label switched path bypasses the link.

12. The method of claim 4,
wherein determining the optical supervisory channel data indicates the event comprises determining, by the network device, the optical supervisory channel data indicates a transient increase or decrease in signal power for the second wavelength traversing the optical fiber, and
wherein the inhibiting comprises inhibiting, by the network device in response to determining the optical supervisory channel data indicates the transient increase or decrease in signal power for the second wavelength traversing the optical fiber, the fast reroute operation for a label switched path that traverses the link to inhibit the network device from subsequently forwarding traffic on a bypass label switched path for the label switched path, wherein the bypass label switched path bypasses the link.

13. The method of claim 1,
wherein determining the optical supervisory channel data indicates the event comprises determining, by the network device, the optical supervisory channel data indicates a persistent attenuation in signal power for the second wavelength traversing the optical fiber, and
wherein the triggering comprises triggering, by the network device in response to determining the optical supervisory channel data indicates the persistent attenuation, the fast reroute operation to cause the network device to subsequently forward traffic on a bypass label switched path for a label switched path that traverses the link, wherein the bypass label switched path bypasses the link.

14. The method of claim 1,
wherein determining the optical supervisory channel data indicates the event comprises determining, by the network device, the optical supervisory channel data indicates a failure of an optical amplifier for the optical fiber that amplifies optical signals transported by the second wavelength traversing the optical fiber, and
wherein the triggering comprises triggering, by the network device in response to determining the optical supervisory channel data indicates the failure of the optical amplifier for the optical fiber that amplifies optical signals transported by the second wavelength traversing the optical fiber, the fast reroute operation to cause the network device to subsequently forward traffic on a bypass label switched path for a label switched path that traverses the link, wherein the bypass label switched path bypasses the link.

15. The method of claim 5,
wherein determining the optical supervisory channel data indicates the event comprises determining, by the network device, the optical supervisory channel data includes fiber attenuation data that describes fiber attenuation for one or more fiber sections of the optical transport system and amplifier data that describes amplifiers for the one or more fiber sections, the method further comprising:
determining, based at least on the fiber attenuation data and the amplifier data, a length of an optical path for the second wavelength,
wherein reconfiguring the configuration of the network device comprises modifying, in any one or more of the traffic engineering database, the routing information base, and the label information base and based at least on the length of the optical path for the second wavelength, a routing metric associated with the link.

16. The method of claim 1, wherein the optical transport system comprises a wavelength-division multiplexing network.

17. The method of claim 1, wherein the network device comprises a layer 3 router.

18. The method of claim 1,
wherein the optical supervisory channel data comprises first optical supervisory channel data, the method further comprising:
sending, by the network device to a remote network device that routes data traffic on the layer 3 network, an indication of the event by sending, via the optical supervisory channel, second optical supervisory channel data that indicates the event.

19. A network device comprising:
one or more processors operably coupled to a memory;
a routing unit configured for execution by the one or more processors to:
route data traffic on a layer 3 network overlaying an optical transport system;
receive optical supervisory channel data for an optical supervisory channel of the optical transport system, wherein the optical supervisory channel is transported by a first wavelength;
determine the optical supervisory channel data indicates an event affecting transmission or detection of a signal transported by a second wavelength, the second wavelength traversing an optical fiber of the optical transport system and underlying a link of the layer 3 network; and
reconfigure, in response to determining the optical supervisory channel data indicates the event, a configuration of the network device to modify routing operations of the network device with respect to the data traffic on the link of the layer 3 network, wherein to reconfigure the configuration the routing unit is configured to trigger an MPLS fast reroute operation within the layer 3 network to bypass the link of the layer 3 network.

20. The network device of claim 19, wherein the optical supervisory channel comprises an in-fiber supervisory channel that is terminated by optical amplifiers of the optical transport system, and wherein the first wavelength outside of the amplification band of the optical amplifiers.

21. The network device of claim 19, further comprising:
a fast reroute unit,
wherein to trigger the MPLS fast reroute operation, the routing unit is configured to trigger the fast reroute unit to perform the fast reroute operation to cause the network device to subsequently forward traffic on a bypass label switched path for a label switched path that traverses the link, wherein the bypass label switched path bypasses the link.

22. The network device of claim 6, further comprising:
a fast reroute unit,
wherein to inhibit the MPLS fast reroute operation the routing unit is configured to inhibit the fast reroute unit from performing the fast reroute operation for a label switched path that traverses the link to inhibit the network device from subsequently forwarding traffic on a bypass label switched path for the label switched path, wherein the bypass label switched path bypasses the link.

23. The network device of claim 7, further comprising:
at least one of a traffic engineering database, a routing information base, and a label information base,
wherein to reconfigure the configuration of the network device the routing unit is configured to modify, in any one or more of the traffic engineering database, the routing information base, and the label information base, a routing metric associated with the link.

24. The network device of claim 6, further comprising:
a fast reroute unit,
wherein to determine the optical supervisory channel data indicates the event, the routing unit is configured to determine the optical supervisory channel data indicates transient amplifier spontaneous emissions by an optical amplifier for the optical fiber that amplifies optical signals transported by the second wavelength traversing the optical fiber, and wherein to inhibit the MIMS fast reroute operation, the routing unit is configured to, in response to determining the optical supervisory channel data indicates the transient amplifier spontaneous emissions, inhibit the fast reroute unit from performing the fast reroute operation for a label switched path that traverses the link to inhibit the network device from subsequently forwarding traffic on a bypass label switched path for the label switched path, wherein the bypass label switched path bypasses the link.

25. The network device of claim 6, further comprising:
a fast reroute unit,
wherein to determine the optical supervisory channel data indicates the event, the routing unit is configured to determine the optical supervisory channel data indicates a transient increase or decrease in signal power for the second wavelength traversing the optical fiber, and
wherein to inhibit the MPLS fast reroute operation, the routing unit is configured to, in response to determining the optical supervisory channel data indicates the transient increase or decrease in signal power for the second wavelength traversing the optical fiber, inhibit the fast reroute unit from performing the fast reroute operation for a label switched path that traverses the link to inhibit the network device from subsequently forwarding traffic on a bypass label switched path for the label switched path, wherein the bypass label switched path bypasses the link.

26. The network device of claim 19, further comprising:
a fast reroute unit,
wherein to determine the optical supervisory channel data indicates the event, the routing unit is configured to determine the optical supervisory channel data indicates a persistent attenuation in signal power for the second wavelength traversing the optical fiber, and
wherein to trigger the MPLS fast reroute operation, the routing unit is configured to trigger, in response to the routing unit determining the optical supervisory channel data indicates the persistent attenuation, the fast reroute operation to cause the network device to subsequently forward traffic on a bypass label switched path for a label switched path that traverses the link, wherein the bypass label switched path bypasses the link.

27. The network device of claim 19, further comprising:
a fast reroute unit,
wherein to determine the optical supervisory channel data indicates the event, the routing unit is configured to determine the optical supervisory channel data indicates a failure of an optical amplifier for the optical fiber that amplifies optical signals transported by the second wavelength traversing the optical fiber, and
wherein to trigger the MPLS fast reroute operation, the fast reroute unit is configured to trigger, in response to the routing unit determining the optical supervisory channel data indicates the failure of the optical amplifier for the optical fiber that amplifies optical signals transported by the second wavelength traversing the optical fiber, the fast reroute operation to cause the network device to subsequently forward traffic on a bypass label switched path for a label switched path that traverses the link, wherein the bypass label switched path bypasses the link.

28. The network device of claim 7, further comprising:
at least one of a traffic engineering database, a routing information base, and a label information base,
wherein to determine the optical supervisory channel data indicates the event, the routing unit is configured to determine the optical supervisory channel data includes fiber attenuation data that describes fiber attenuation for one or more fiber sections of the optical transport system and amplifier data that describes amplifiers for the one or more fiber sections,
wherein the routing unit is further configured to determine, based at least on the fiber attenuation data and the amplifier data, a length of an optical path for the second wavelength,
wherein to reconfigure the configuration of the network device the routing unit is configured to modify, in any one or more of the traffic engineering database, the routing information base, and the label information base and based at least on the length of the optical path for the second wavelength, a routing metric associated with the link.

29. The network device of claim 19, wherein the optical transport system comprises a wavelength-division multiplexing network.

30. The network device of claim 19, wherein the network device comprises a layer 3 router.

31. The network device of claim 19,
wherein the optical supervisory channel data comprises first optical supervisory channel data,
wherein the routing unit is further configured to send, to a remote network device that routes data traffic on the layer 3 network, an indication of the event by sending, via the optical supervisory channel, second optical supervisory channel data that indicates the event.

32. The network device of claim 19, further comprising:
a dense wavelength-division multiplexing-capable interface card configured to terminate the optical supervisory channel and provide the optical supervisory data to the routing unit.

33. A non-transitory computer-readable medium comprising instructions for causing one or more programmable processors to:
receive, by a network device that routes data traffic on a layer 3 network overlaying an optical transport system, optical supervisory channel data for an optical supervisory channel of the optical transport system, wherein the optical supervisory channel is transported by a first wavelength;
determine, by the network device, the optical supervisory channel data indicates an event affecting transmission or detection of a signal transported by a second wavelength, the second wavelength traversing an optical fiber of the optical transport system and underlying a link of the layer 3 network; and
reconfigure, by the network device in response to determining the optical supervisory channel data indicates the event, a configuration of the network device to modify routing operations of the network device with respect to the data traffic on the link of the layer 3 network, wherein the instructions for causing the one or more programmable processors to reconfigure the configuration of the network device to modify routing operations of the network device with respect to the data traffic on the link of the layer 3 network comprises at least one of (1) instructions for causing the one or more programmable processors to trigger an MPLS fast reroute operation within the layer 3 network to bypass the link of the layer 3 network, (2) instructions for causing the one or more programmable processors to inhibit an MPLS fast reroute operation within the layer 3 network from bypassing the link of the layer 3 network, and (3) instructions for causing the one or more programmable processors to modify any one or more of a traffic engineering database, a routing information base, and a label information base stored by the network device.

* * * * *